May 18, 1926.
A. N. ANTHES
1,585,225
DUSTPROOF SPRING LINK AND BOLT OILER
Filed June 12, 1924
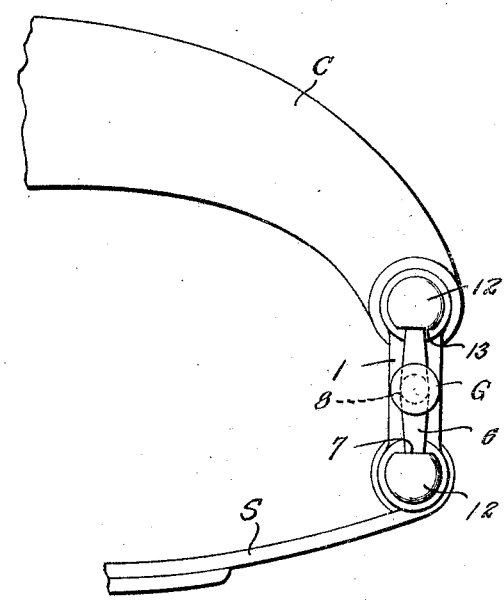
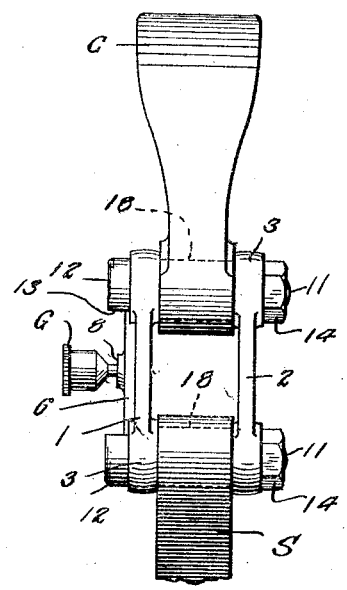
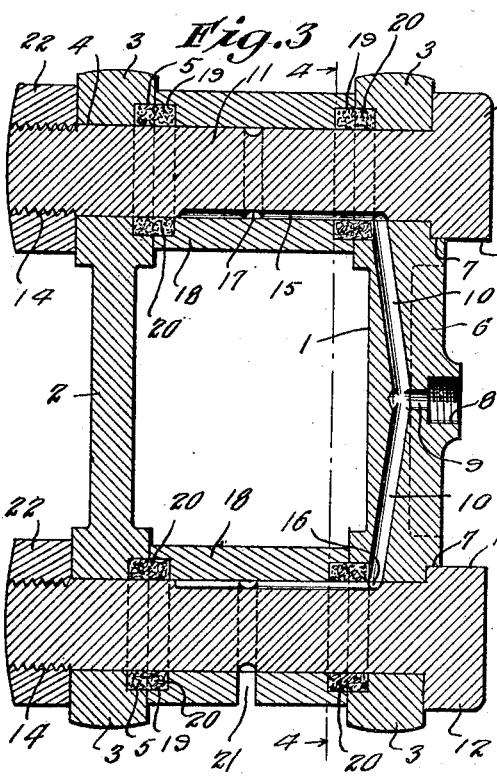
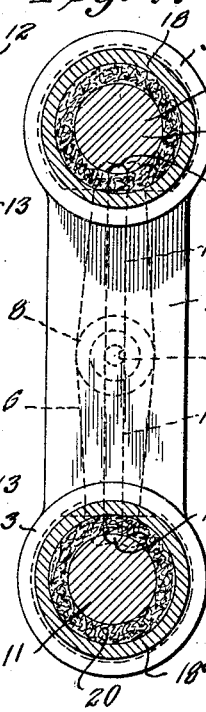
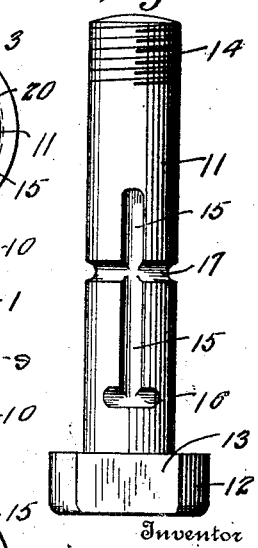
Inventor
A. N. Anthes Patented May 18, 1926.

1,585,225

UNITED STATES PATENT OFFICE.

ALBERT N. ANTHES, OF QUINCY, ILLINOIS, ASSIGNOR OF ONE-HALF TO ROBERT F. GUNTHER, OF QUINCY, ILLINOIS.

DUSTPROOF SPRING LINK AND BOLT OILER.

Application filed June 12, 1924. Serial No. 719,604.

The object of my invention is to provide a novel link and novel means for oiling same; and to provide the novel combination and arrangements of parts disclosed in the accompanying drawings in which—

Figure 1 is a side elevation of my invention;

Fig. 2 is an end view of same;

Fig. 3 is a section through the link;

Fig. 4 is a section on line 4—4 of Fig. 3; and

Fig. 5 is a detail elevation of the bolt detached from the link.

Like characters of reference designate like parts in each of the several views.

Referring to the accompanying drawings, I provide the link members 1 and 2, each of the link members having enlarged hub portions 3 orificed to receive the bolts 11, which bolts are provided with heads 12. The bolt heads have flat portions 13, which seat in the recesses 7 of link member 1 and thus lock the bolts 11 against turning. The bolts have threaded ends 14 to which the nuts 22 are attached to secure the link to the chassis frame C and the spring S, as shown in Figs. 1 and 2.

Hubs 3 are provided with annular chambers 5 and bronze bushings 18 are provided with aligned annular chambers 19 to receive the dust or packing rings 20, as shown in Figs. 3 and 4.

Link member 1 is provided with a boss 8 to which the grease cup G is screw threaded, the grease cup being in communication, through passage 9 and longitudinal passages 10 in link member 1, with the grooves 16, 15 and 17 in bolts 11 as illustrated in Figs. 3, 4 and 5. I provide an oil groove 21 in the lowermost bronze bushing 18, as shown in Fig. 3, to permit oil to flow from the link to the spring S to the end of which the assembled link is attached.

In operation, oil is supplied through grease cup G and flows through passages 9, 10, 16, 15 and 17 to the surface of the bolts 11 and the packing rings 20 and efficiently lubricates the device and prevents squeaks and wear.

What I claim is:

In a device of the class described, the combination of a plurality of link members each having hub portions, bushings spacing said hub portions apart, the hub portions and the bushings having chambered portions to contain packing rings, bolts mounted in the hub portions of the links, the bolts having flat portions seated in the recessed portions of one of the links to prevent their turning, oil passages through one of the links communicating with the respective bolts the bolts having longitudinal and encircling grooves with one of which the oil passages of the link member communicate.

ALBERT N. ANTHES.